(12) United States Patent
Yamamoto

(10) Patent No.: US 8,675,129 B2
(45) Date of Patent: Mar. 18, 2014

(54) TELEVISION SYSTEM AND CONTROL METHOD THEREOF

(75) Inventor: Kosuke Yamamoto, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 1235 days.

(21) Appl. No.: 12/065,579

(22) PCT Filed: Sep. 1, 2006

(86) PCT No.: PCT/JP2006/317358
§ 371 (c)(1),
(2), (4) Date: Mar. 3, 2008

(87) PCT Pub. No.: WO2007/029621
PCT Pub. Date: Mar. 15, 2007

(65) Prior Publication Data
US 2009/0102970 A1    Apr. 23, 2009

(30) Foreign Application Priority Data
Sep. 5, 2005 (JP) ................. 2005-256863

(51) Int. Cl.
*H04N 7/00* (2011.01)
*H04N 11/00* (2006.01)

(52) U.S. Cl.
USPC .............. 348/552; 348/569; 714/57

(58) Field of Classification Search
USPC .............. 348/552, 569; 358/1.15; 714/57
See application file for complete search history.

(56) References Cited

U.S. PATENT DOCUMENTS

| 5,353,399 A * | 10/1994 | Kuwamoto et al. ........... 715/736 |
| 5,436,676 A * | 7/1995 | Pint et al. ..................... 348/734 |
| 5,786,864 A | 7/1998 | Yamamoto .................... 348/473 |
| 5,887,193 A | 3/1999 | Takahashi et al. ........... 395/828 |
| 7,020,881 B2 | 3/2006 | Takahashi et al. ........... 719/322 |
| 7,199,891 B1 * | 4/2007 | Ihara ............................ 358/1.15 |
| 7,545,525 B2 * | 6/2009 | Idehara ....................... 358/1.15 |
| 7,633,642 B2 * | 12/2009 | Shibamiya et al. .......... 358/1.15 |
| 2002/0035620 A1 | 3/2002 | Takahashi et al. ........... 709/220 |
| 2002/0060748 A1 * | 5/2002 | Aratani et al. ............... 348/552 |
| 2002/0062487 A1 * | 5/2002 | Ohno et al. .................. 725/133 |

(Continued)

FOREIGN PATENT DOCUMENTS

| JP | 7-44474 | 2/1995 |
| JP | 9-116819 | 5/1997 |

(Continued)

OTHER PUBLICATIONS

International Search Report, Written Opinion, and International Preliminary Report on Patentability in PCT/JP2006/317358.

(Continued)

*Primary Examiner* — Nnenna Ekpo
(74) *Attorney, Agent, or Firm* — Fitzpatrick, Cella, Harper & Scinto

(57) ABSTRACT

There is disclosed a method of controlling a television system which can connect to a printing apparatus, and has a display unit. Display/non-display of the status information is set (S13, S14). Status information of the printing apparatus is received from the printing apparatus (S101). The control is made to display the status information on the display unit when the display of the status information is set, and not to display the status information on the display unit when the non-display of the status information is set (S102, S103).

19 Claims, 13 Drawing Sheets

(56) References Cited

U.S. PATENT DOCUMENTS

| | | | |
|---|---|---|---|
| 2002/0135807 A1* | 9/2002 | Idehara | 358/1.15 |
| 2004/0057767 A1* | 3/2004 | Parry | 400/74 |
| 2004/0263533 A1 | 12/2004 | Yamamoto et al. | 345/619 |
| 2005/0068571 A1* | 3/2005 | Hart et al. | 358/1.15 |
| 2005/0084314 A1* | 4/2005 | Anderson et al. | 400/625 |
| 2005/0231639 A1* | 10/2005 | Kubota et al. | 348/552 |
| 2006/0070080 A1 | 3/2006 | Takahashi et al. | 719/315 |

FOREIGN PATENT DOCUMENTS

| | | |
|---|---|---|
| JP | 9-121313 | 5/1997 |
| JP | 11-085449 A | 3/1999 |
| JP | 2001-7824 | 1/2001 |
| JP | 2001-8146 | 1/2001 |
| JP | 2002-175225 A | 6/2002 |
| JP | 2002-215483 | 8/2002 |
| JP | 2003-219353 A | 7/2003 |
| JP | 2005-236777 A | 9/2005 |

OTHER PUBLICATIONS

Translation of International Preliminary Report on Patentability in PCT/JP2006/317358.

* cited by examiner

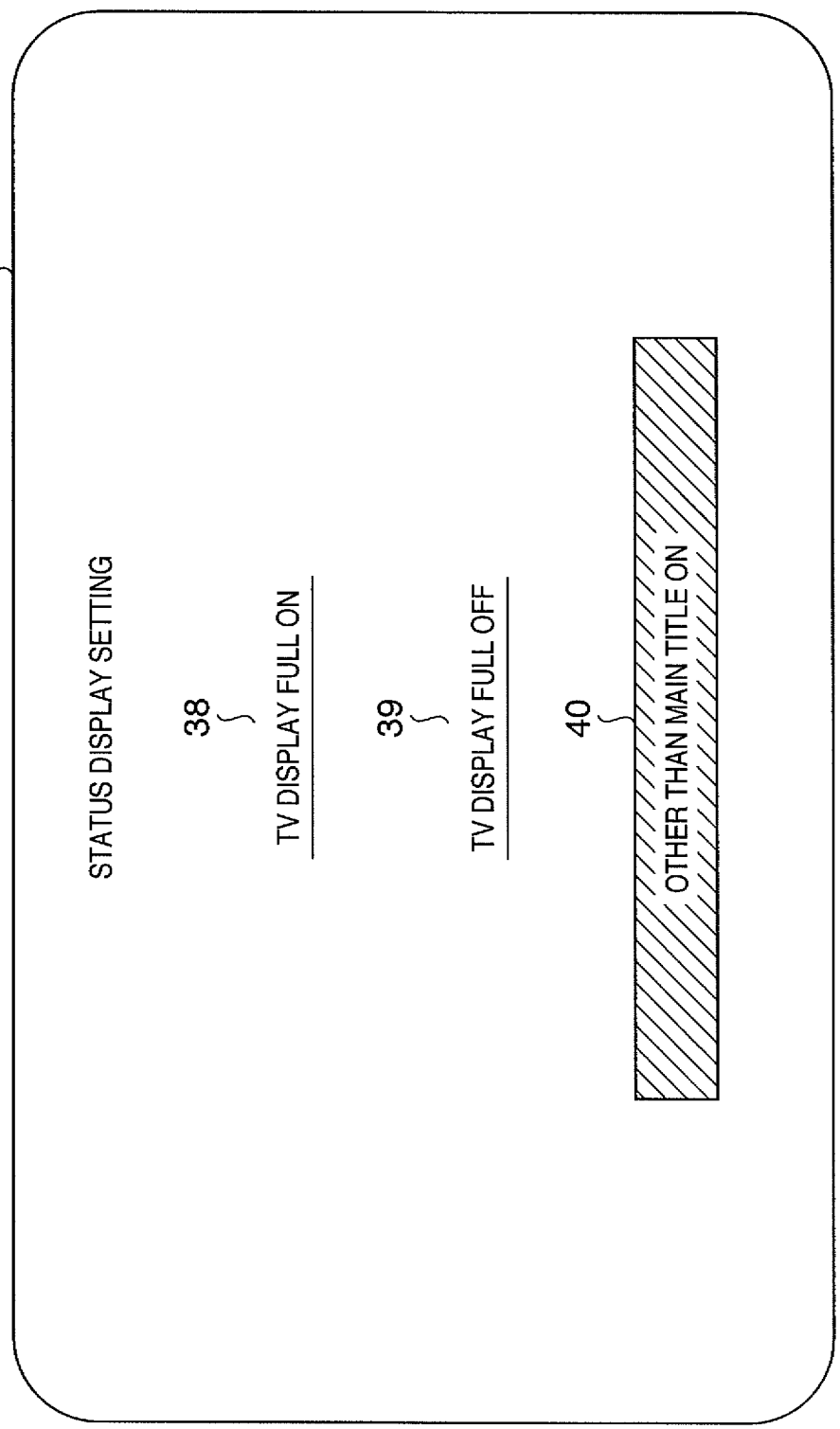

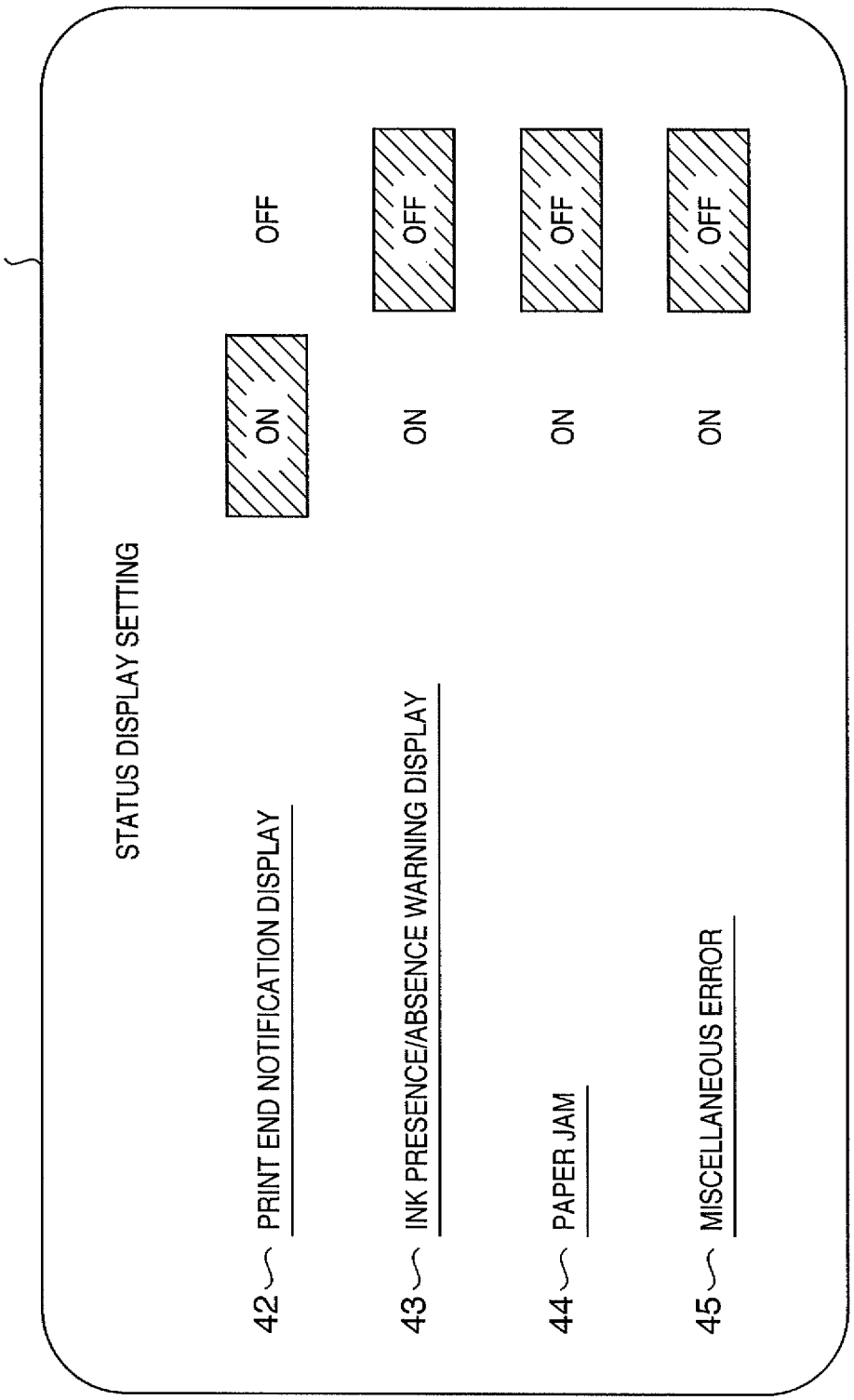

TELEVISION SYSTEM AND CONTROL METHOD THEREOF

TECHNICAL FIELD

The present invention relates to a television system and control method thereof and, more particularly, to a television system which can be connected to a printing apparatus and a control method thereof.

BACKGROUND ART

Recently, along with the digitization of a television (to be abbreviated as "TV" hereinafter), the TV can display information of not only broadcasting (terrestrial or satellite broadcasting) but also various information sources. For example, the TV can display digital camera images via a memory card slot, Internet contents via a LAN interface, and the like.

Upon diversification of information, contents for printing are expected to increase, and the print standards of a printing system including a digital TV and printing apparatus are being stipulated.

On the other hand, in a conventional prevalent system using a personal computer (to be abbreviated as "PC" hereinafter) and a printing apparatus which is connected to the PC, the PC and the printing apparatus exchange various kinds of information via a USB interface or the like. For example, status information to be sent from the printing apparatus to the PC includes:

1. Upon transmitting a print signal, amount of remaining ink information is transmitted from the printing apparatus side to the PC at the same time, and if an amount of remaining ink is small, a warning mark is displayed on the PC screen.
2. When printing cannot be done due to paper-out, a paper-out error is displayed on the PC screen.
3. When a paper jam has occurred upon feeding a paper sheet, a jam error is displayed on the PC screen.
4. When the printing apparatus can detect the presence/absence of paper sheets set inside itself, if a print signal is transmitted while a paper-out error is detected, a paper-out warning is displayed at that time.
5. Upon transmitting a print signal, a progress display indicating that printing is in progress is made on the PC screen.

With these displays, the user can recognize the status of the printing apparatus at that time via a large-size screen display, thus improving operability. For a printing apparatus which can be connected to a TV and can print received contents, as an invention that provides the same operation environment as an apparatus connected to a PC, for example, that disclosed in patent reference 1 is available.

This invention discloses a TV receiver which incorporates an image print output function comprising display means for displaying characters, numerals, symbols, and pictures on a TV screen. This TV receiver is characterized by displaying, on the TV screen, information indicating that printing of image data is in progress using at least one of characters, numerals, symbols, and pictures in synchronism with a print output from printer means.

Patent Reference 1: Japanese Patent Laid-Open No. 9-121313

DISCLOSURE OF INVENTION

Problems that the Invention is to Solve

However, a system that connects a PC to a printing apparatus and that which connects a TV to a printing apparatus have the following differences.

On the PC, even when the status of the printing apparatus is displayed during a certain operation, the entire screen of the PC is not occupied by a status dialog. When an operation window is activated, the status dialog can be hidden behind the operation window, and the user does not find the status dialog disturbing during the operation.

By contrast, upon making a status display in a printing system including a printing apparatus which is connected to a TV and can print received contents, since the TV's principal contents are temporary broadcasting information, status information occupies the entire screen, albeit for several seconds. It is expected that many users find such display disturbing.

That is, displaying information indicating that printing of printer means is in progress on the TV screen using characters, numerals, symbols, and pictures as needed, as described in patent reference 1 does not always mean high operability.

The present invention has been made in consideration of the aforementioned problems, and has as its object to reduce the disturbing feeling that the user who is watching a TV may experience upon displaying status information of an external printing apparatus on the TV.

Means of Solving the Problems

In order to achieve the above object, according to the present invention, there is provided a television system which can connect to an external printing apparatus, comprising: a display unit; a reception unit adapted to receive status information of the external printing apparatus from the external printing apparatus; a setting unit adapted to set whether or not to display a status of the external printing apparatus on the display unit in accordance with the received status information; and a control unit adapted to, when said setting unit sets to display the status of the external printing apparatus, control to make the status of the external printing apparatus displayed on said display unit, and when said setting unit sets not to display the status of the external printing apparatus, control to make the status information not displayed on said display unit and control the external printing apparatus so as to display the status of the external printing apparatus on a display unit provided on the external printing apparatus.

According to the present invention, there is provided a method of controlling a television system which can connect to an external printing apparatus, and has a display unit, comprising: a setting step of setting whether or not to display a status of the external printing apparatus on the display unit in accordance with status information of the external printing apparatus; a reception step of receiving status information of the external printing apparatus from the external printing apparatus; and a display step of controlling, when it is set to display the status of the external printing apparatus in the setting step, to display the status of the external printing apparatus on the display unit, and when it is set not to display the status of the external printing apparatus in the setting step, not to display the status of the external printing apparatus on the display unit and to display the status of the external printing apparatus on a display unit provided on the external printing apparatus.

Effects of the Invention

According to the present invention, the disturbing feeling the user who is watching the TV may experience upon displaying the status information of the external printing apparatus on the TV can be reduced.

Other features and advantages of the present invention will become apparent from the following description of exemplary embodiments with reference to the attached drawings. Note that the same reference numerals denote the same or similar components throughout the attached drawings.

BRIEF DESCRIPTION OF DRAWINGS

FIG. 12 shows an example of a status display setting window according to the fourth embodiment of the present invention; and FIG. 13 shows an example of a status display setting window according to the fifth embodiment of the present invention.

DESCRIPTION OF REFERENCE NUMERALS

Figure 1:
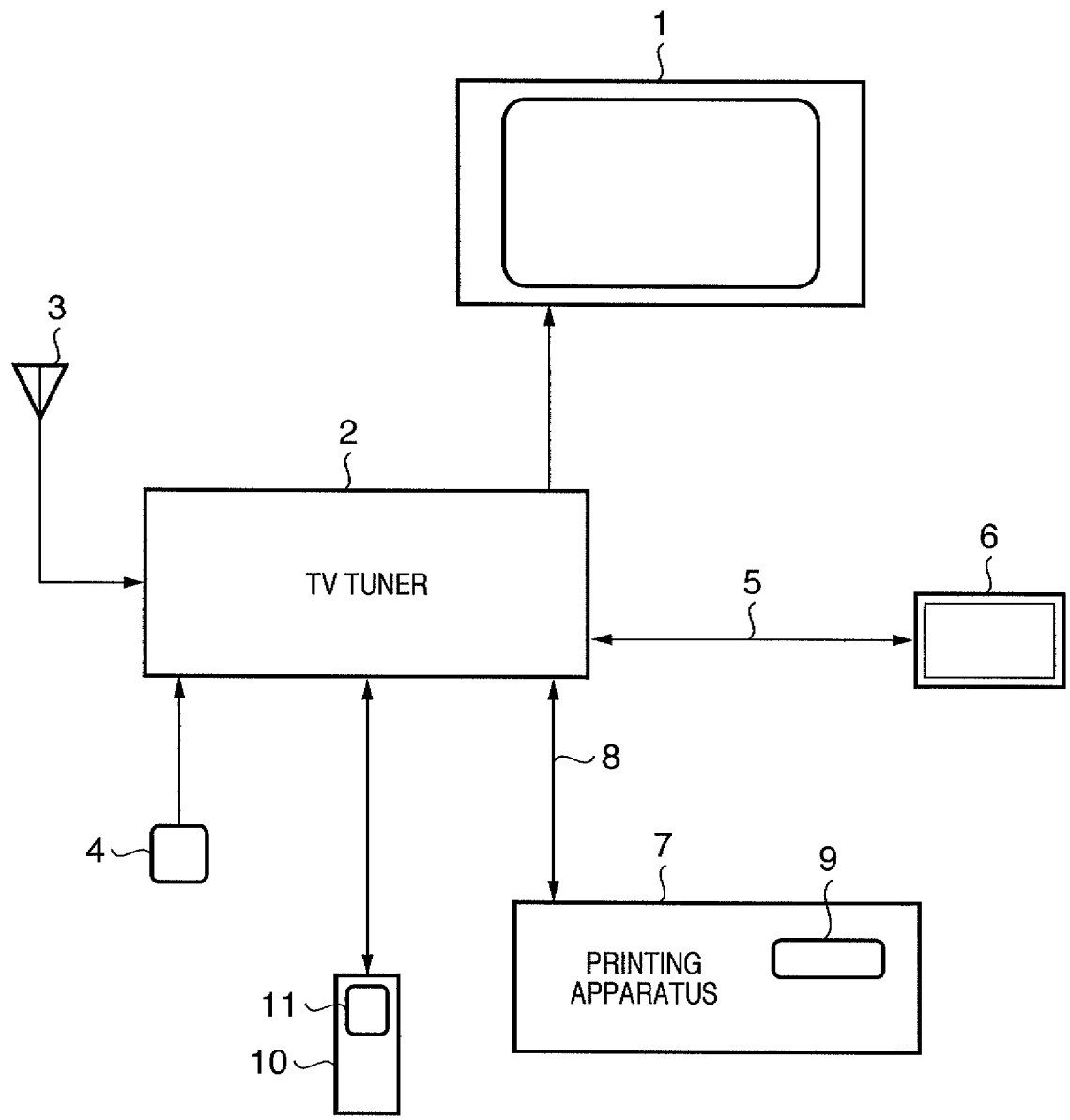
FIG. 1 is a system diagram of a TV system according to the first embodiment of the present invention.

1: TV panel
2: TV tuner
3: Antenna
4: Memory card
5: LAN cable
6: Internet
7: Printing apparatus
8: LAN cable
9: Liquid crystal display for status display
10: Remote controller
11: Liquid crystal display
12: Broadcasting channel button group
13: Select button
14: Tone volume control button
15: Print button
16: Menu button
17: Rotary switch
18: Four arrow keys
19: Enter button
20: TV power ON button

BEST MODE FOR CARRYING OUT THE INVENTION

The best mode for carrying out the present invention will be described in detail hereinafter with reference to the accompanying drawings. It should be noted that the dimensions, shapes, relative arrangements, and the like of the components exemplified in the embodiments of the present invention are to be changed as needed depending on the arrangements and various conditions of apparatuses to which the present invention is applied, and do not limit the present invention.

First Embodiment

FIG. 1 is a system diagram showing a TV system according to the present invention.

Referring to FIG. 1, reference numeral 1 denotes a TV panel of a CRT, liquid crystal display, plasma display, or the like, which displays various contents.

Reference numeral 2 denotes a terrestrial digital TV tuner (to be referred to as "TV tuner" hereinafter); and 3, a terrestrial digital broadcasting reception antenna (to be referred to as "antenna" hereinafter). As for the TV panel and TV tuner, there are two types, that is, an integrated type and separate type.

A broadcast signal received via the antenna 3 undergoes video processing inside the TV tuner 2, and is displayed on the TV panel 1. Reference numeral 4 denotes a memory card which is inserted into a memory card slot provided to the TV tuner 2, so that the TV tuner 2 can fetch image information and the like recorded in the memory card 4 and can display the fetched information on the TV panel 1. Reference numeral 5 denotes a LAN cable, which connects to the Internet 6 via a router or the like (not shown).

As described above, the combination of the TV tuner 2 and TV panel 1 of the present invention can display various contents from three information sources, that is, the broadcasting, memory card, and LAN (Internet).

Reference numeral 7 denotes a printing apparatus such as an ink-jet printer or the like, which is connected via the TV tuner 2 and LAN cable 8. The printing apparatus 7 comprises a liquid crystal display 9 for status display, and can display various kinds of print status information. When the printing apparatus 7 is an ink-jet printer, it prints by discharging liquid inks. However, the present invention is not limited to such specific type of the printing apparatus 7, and printing apparatuses of any other print types may be used. Reference numeral 10 denotes a remote controller as an accessory of the TV tuner 2, which can remote-control various settings of the TV tuner 2. The remote controller 10 also comprises a liquid crystal display 11, which allows the user to confirm various TV settings.

Figure 2:
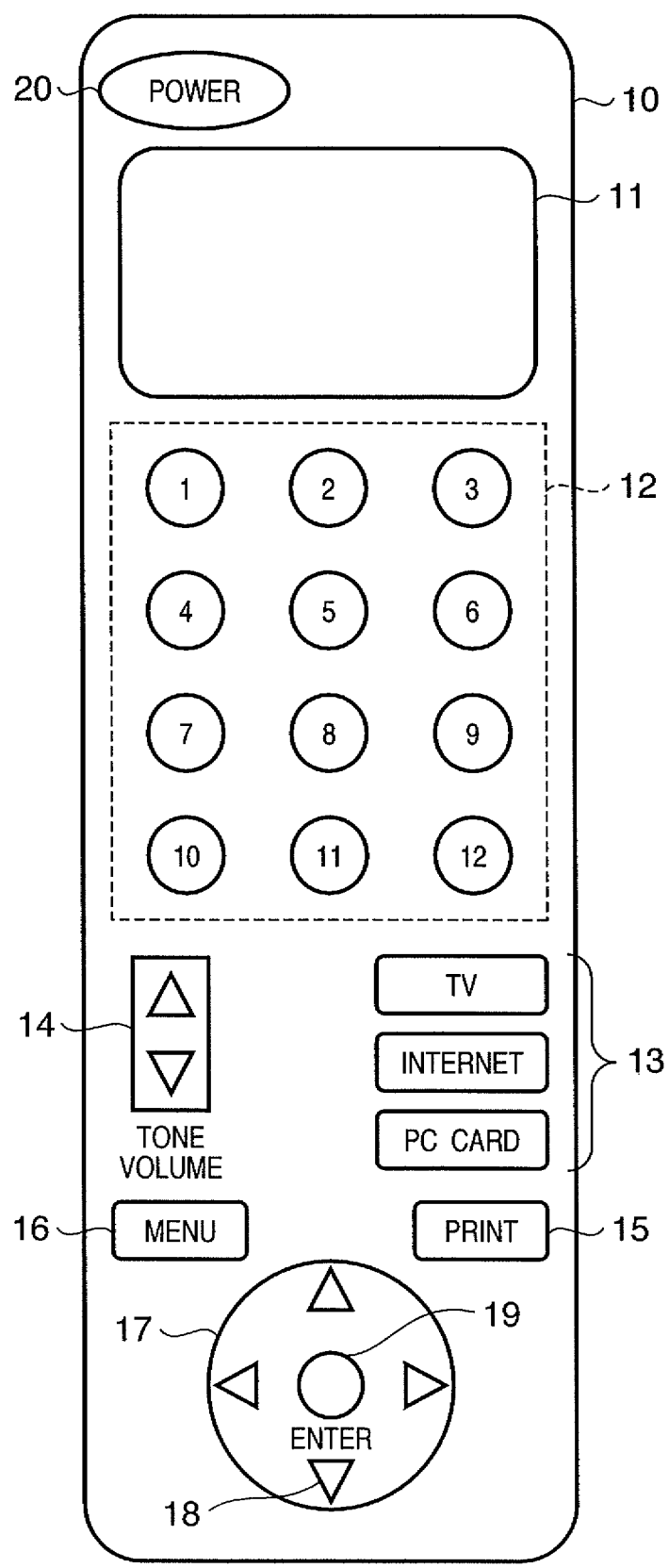
FIG. 2 is a front view of a remote controller according to the first embodiment of the present invention.

FIG. 2 is a front view showing an example of the remote controller 10.

Referring to FIG. 2, reference numeral 20 denotes a TV power ON button; 11, the liquid crystal display; and 12, a broadcasting channel button group. Reference numeral 13 denotes select buttons of the aforementioned broadcasting, LAN (Internet), and memory card display windows. Upon pressing a desired one of TV, INTERNET, and PC CARD buttons, an input source can be selected. Reference numeral 14 denotes tone volume control buttons. Reference numeral 15 denotes a print button. If the printing apparatus 7 is connected, when the user presses this print button 15, the printing apparatus 7 is automatically turned on if the printing apparatus 7 is off and a print instruction of an image displayed on the TV panel 1 at that time is output. Reference numeral 16 denotes a menu button, which makes the TV panel 1 display various setting windows of the TV and printing apparatus 7. Reference numeral 17 denotes a rotary switch which includes four arrow keys 18 and an enter button 19. The rotary switch 17 is used for various purposes such as selection of items on a displayed setting window, selection of a link on an Internet window, and the like.

In the TV with the above arrangement, when the user presses the print button 15, a print instruction of an image displayed on the TV panel 1 is issued to the printing apparatus 7. The printing apparatus 7 prints that image based on this print instruction, and displays status information at that time. The status information includes, for example, an amount of remaining ink warning displayed when the remaining amount of a printing material (ink, since the printing apparatus of this embodiment adopts the ink-jet system) is running short, and progress information that indicates the progress state of printing. In addition, the status information includes paper-out error information when there is no printing medium such as a paper sheet or the like, jam error information when a jam has occurred in the printing apparatus 7, and the like. Note that there is also status information which is displayed when an error has occurred in the printing apparatus 7 regardless of the print instruction from the TV, including, error information, such as amount of remaining ink information and paper-out error information.

Figure 3:
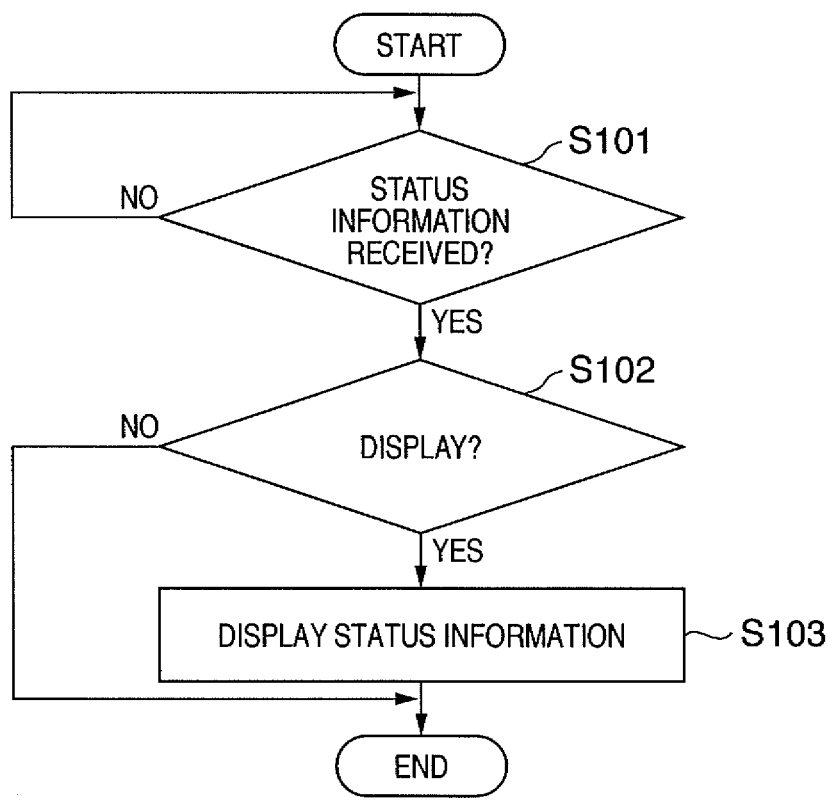
FIG. 3 is a flowchart showing status information display/non-display processing according to the first embodiment of the present invention.

Conventionally, status information is displayed regardless of the operation state of the TV. However, in this embodiment, such display of status information is limited. Display control of status information in the first embodiment will be described below with reference to FIG. 3.

It is checked in step S101 if status information is received from the printing apparatus 7. If status information is received, the process advances to step S102 to check if the user has set to display the status information. If the user has set to display the status information, the status information is displayed on the TV panel 1 for a predetermined period of time in step S103, thus ending the processing. On the other hand, if the user has set not to display the status information (to set a non-display mode), the processing ends without displaying the status information. Note that the display/non-display checking process in step S102 is executed by a CPU or the like in the TV tuner 2.

Figure 4:
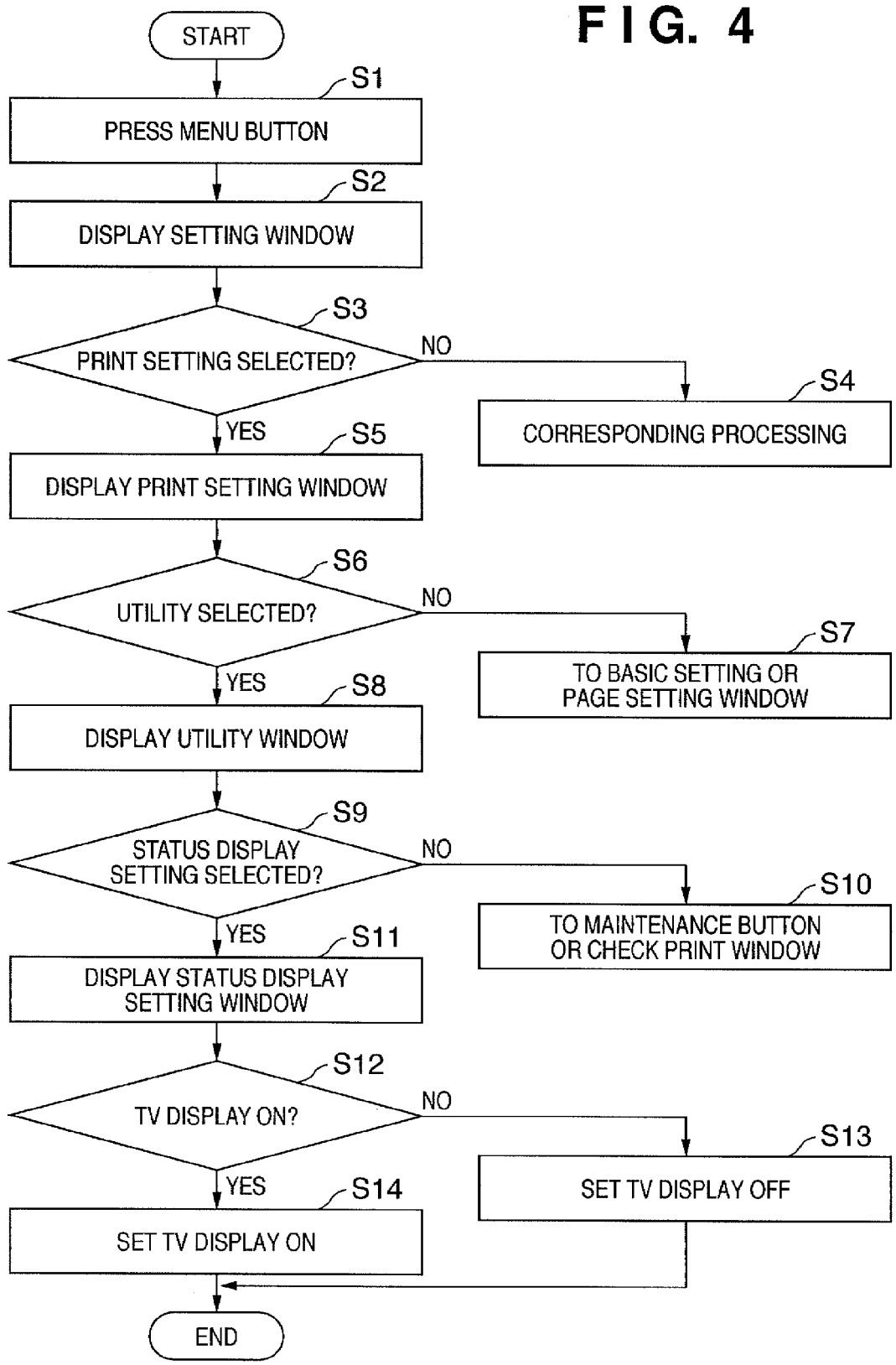
FIG. 4 is a flowchart showing status information display/non-display setting processing according to the first embodiment of the present invention.

The display/non-display setting processing of status information of the printing apparatus 7 according to the first embodiment will be described below with reference to the flowchart of FIG. 4. In the following description, "pressing a button" indicates an action in which the user actually presses a certain button as for mechanical buttons. On the other hand, as for so-called software buttons displayed on the TV panel 1, "pressing a button" means an action in which that the user selects a desired button using the four arrow keys 18 and the like of the remote controller 10, and then presses the enter button 19.

Figure 5:
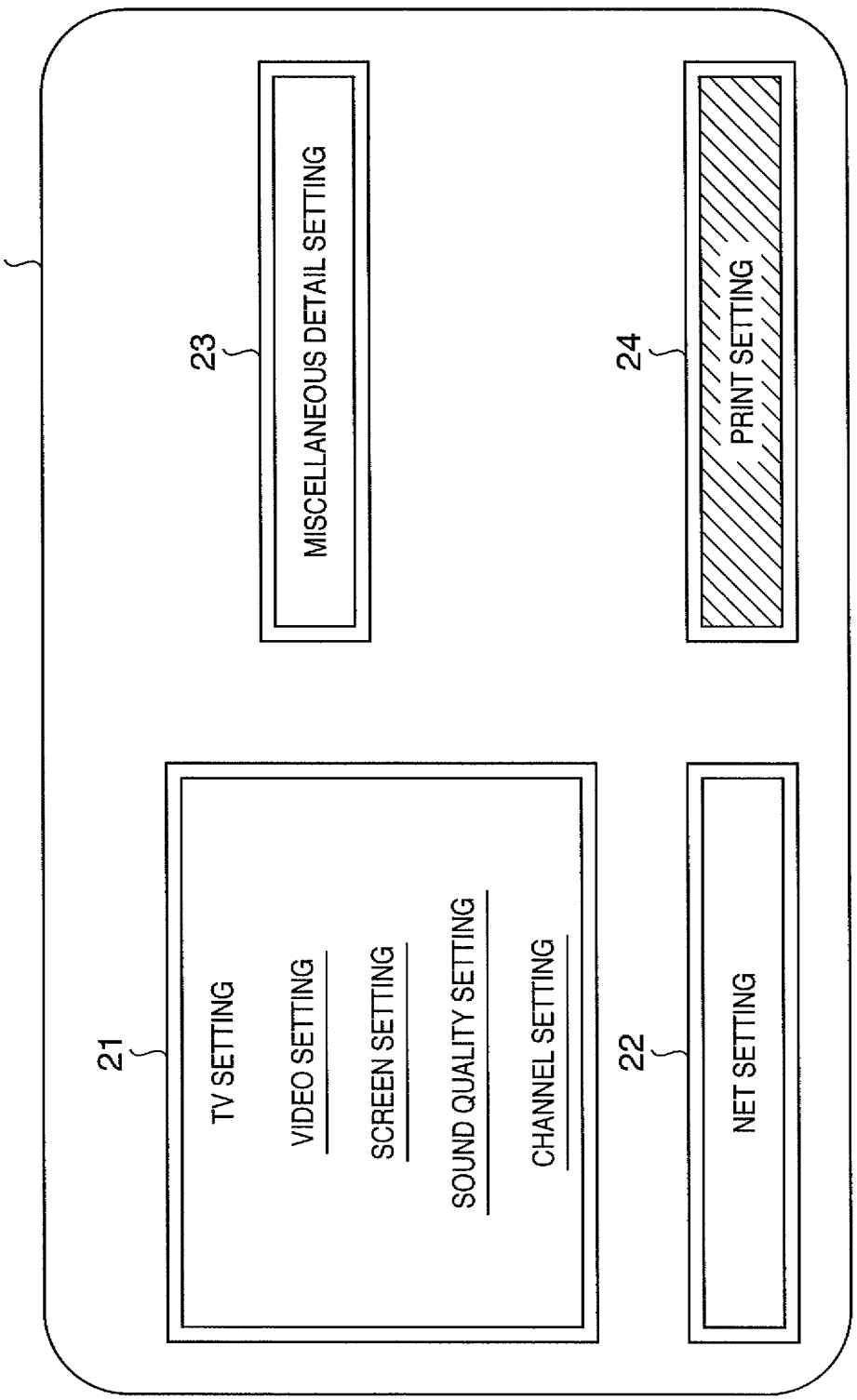
FIG. 5 shows an example of a menu setting window according to the first embodiment of the present invention.

If the user presses the menu button 16 of the remote controller 10 in step S1, a setting window is displayed on the TV panel 1 in step S2. FIG. 5 shows an example of the window displayed at that time. Roughly speaking, on-screen buttons such as a TV setting button 21, Internet setting button 22, miscellaneous detail setting button 23, and print setting button 24 appear.

Figure 6:
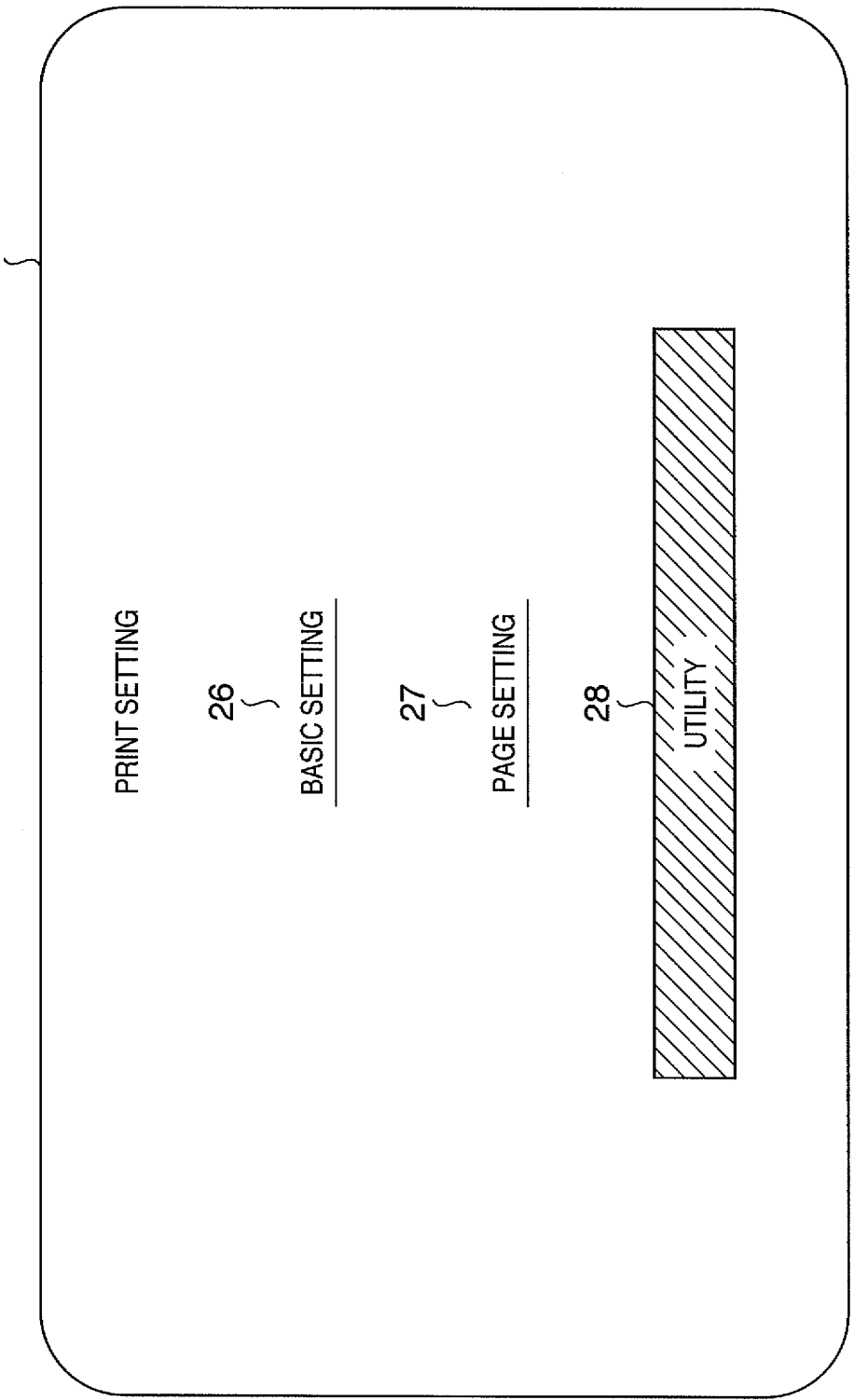
FIG. 6 shows an example of a print setting window according to the first embodiment of the present invention.

Referring to FIG. 5, if the user presses the print setting button 24 (YES in step S3), the current window is switched to a print setting window shown in FIG. 6 (step S5). If the user presses a button other than the print setting button 24, the process advances to step S4 to execute the corresponding processing. Note that the processing in step S4 is not directly related to the status information display/non-display setting processing, and a detailed description thereof will not be given.

FIG. 6 shows an example of the print setting window. The window includes a basic setting button 26, page setting button 27, and utility button 28. It is checked in step S6 if the user presses the utility button 28. If the user presses a button other than the utility button 28, that is, the basic setting button 26 or page setting button 27, the process advances to step S7. In step S7, the current window is switched to a predetermined window, and the corresponding processing is executed. On a basic setting window, the user sets a paper type, image quality and speed levels, and the like. On a page setting window, the user can select a paper size, portrait/landscape, borderless/border printing, and the like. These processes are not directly related to the status information display/non-display setting processing, and a detailed description thereof will not be given.

Figure 7:
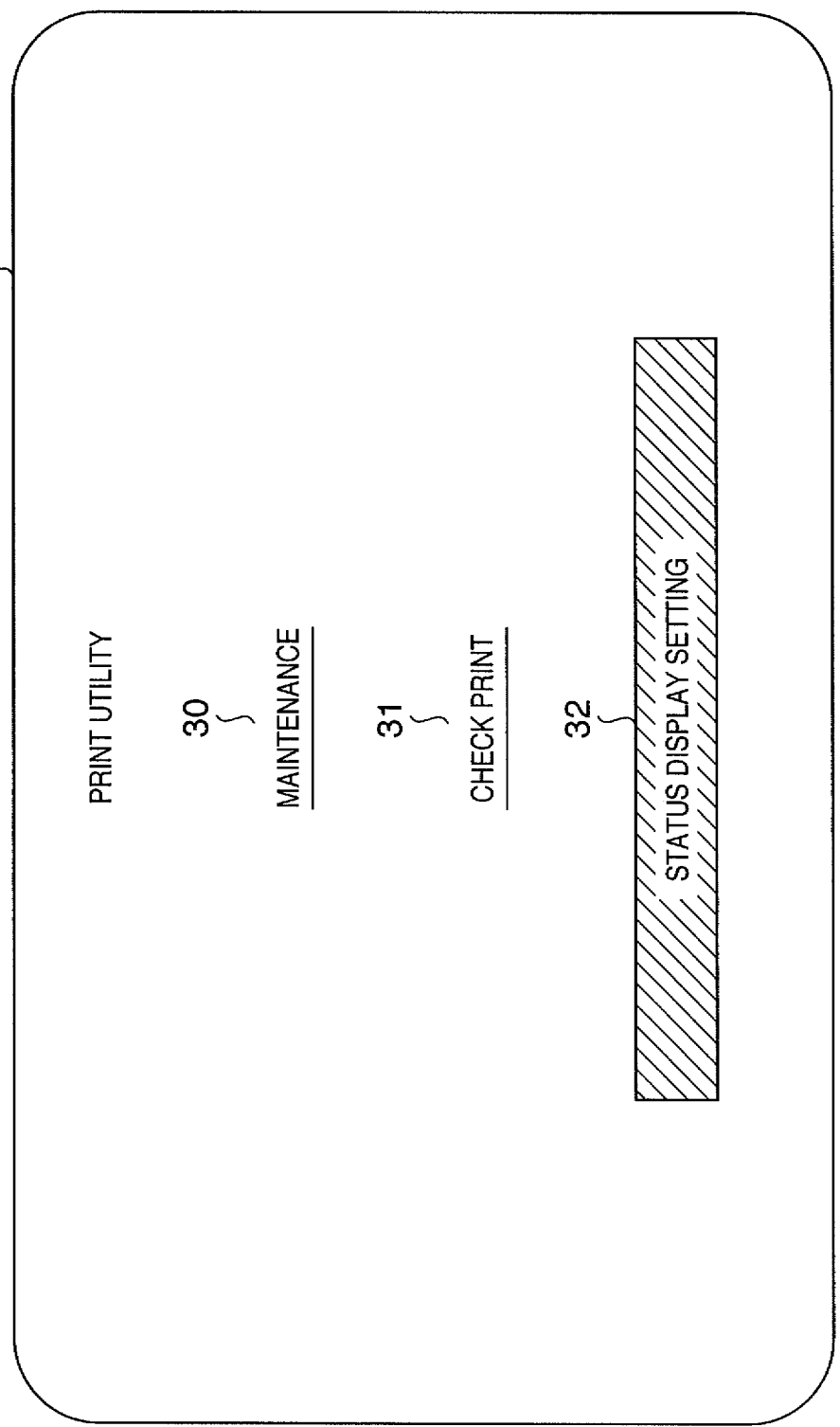
FIG. 7 shows an example of a print utility window according to the first embodiment of the present invention.

On the other hand, if the user presses the utility button 28 (YES in step S6), the current window is switched to a window shown in FIG. 7 (step S8). On the window shown in FIG. 7, a maintenance button 30, check print button 31, and status display setting button 32 appear. Maintenance functions such as cleaning of discharge nozzles and the like are assigned to the maintenance button 30, and a print function for checking the nozzle discharge state is assigned to the check print button 31.

Figure 8:
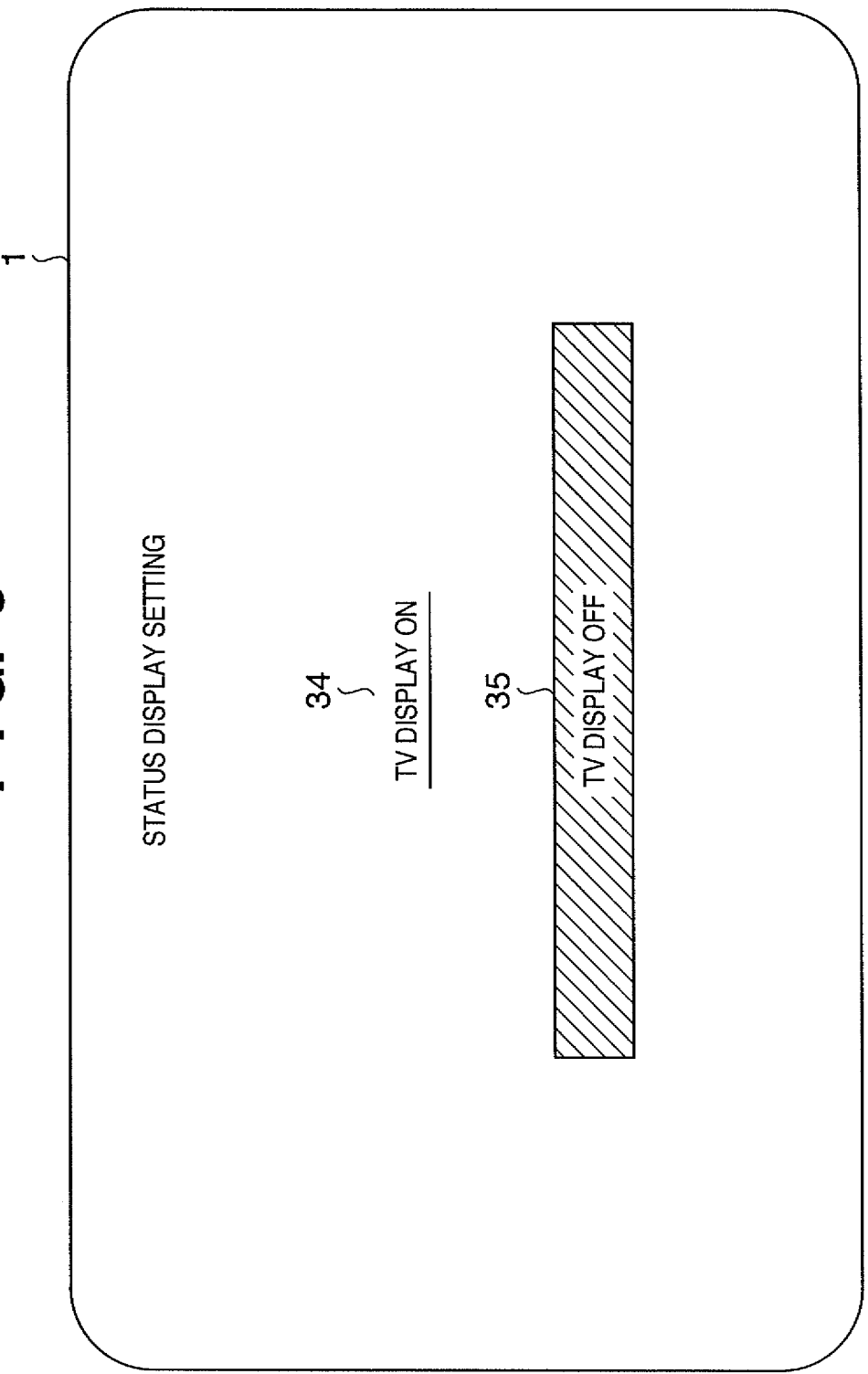
FIG. 8 shows an example of a status display setting window according to the first embodiment of the present invention.

If the user presses the status display setting button 32 on the window shown in FIG. 7 (YES in step S9), the current window is switched to a window shown in FIG. 8 (step S11). If the user presses the maintenance button 30 or check print button 31 (NO in step S9), the process advances to step S10. In step S10, the current window is switched to a predetermined window to execute the corresponding processing. These processes are not directly related to the status information display/non-display setting processing, and a detailed description thereof will not be given.

FIG. 8 shows an example of the status display setting window. This window provides two options. If the user selects a TV display ON button 34 (YES in step S12), it is set to display various statuses of the printing apparatus 7 on the TV panel 1 (step S14).

Figure 9:
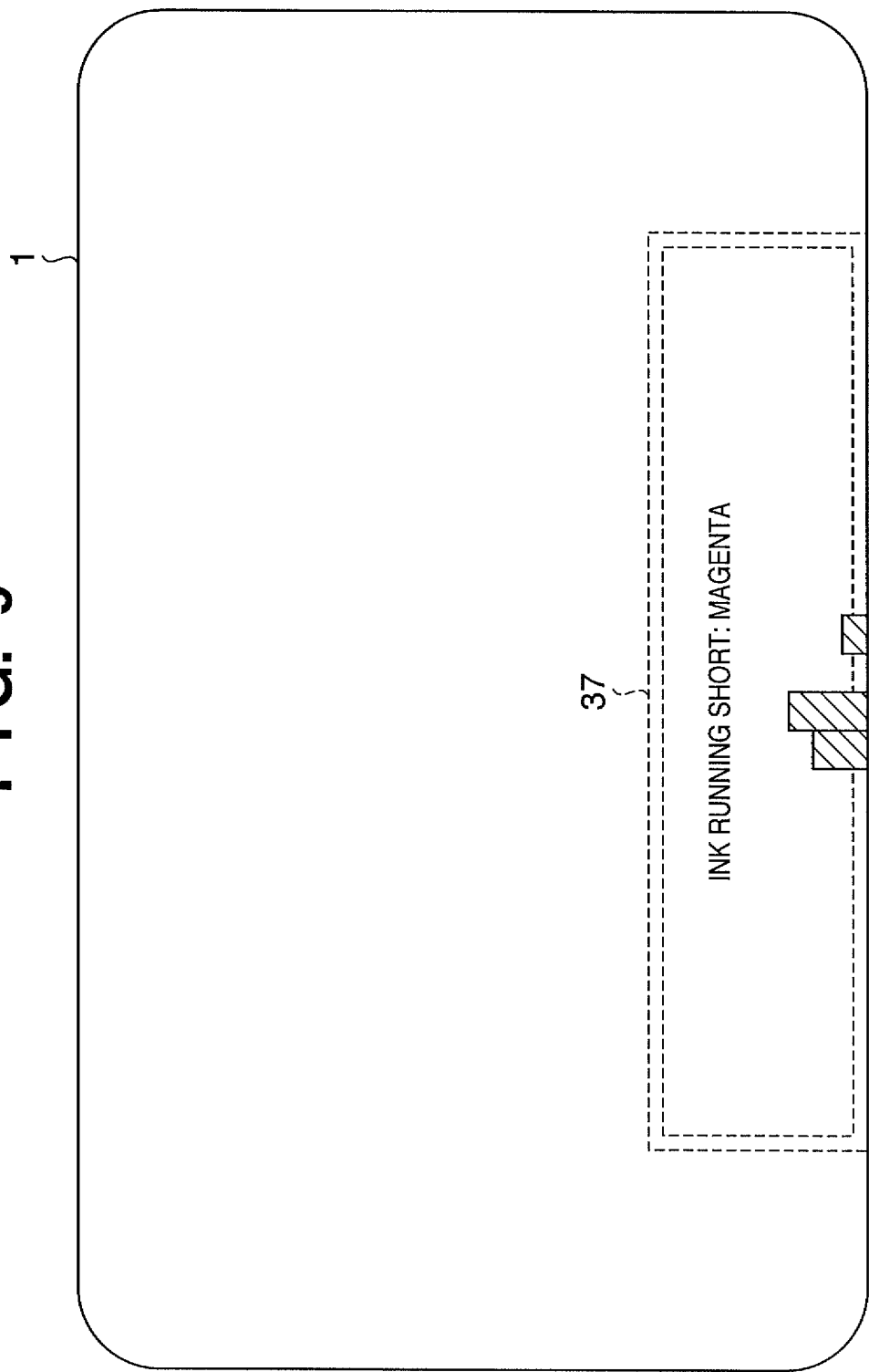
FIG. 9 shows a display example upon generation of an amount of remaining ink warning according to the first embodiment of the present invention.

FIG. 9 shows a display example when an amount of remaining ink warning of the status information has occurred. When the printing apparatus 7 has an amount of remaining ink detection function, if the user presses the print button 15 to start printing while he or she selects the TV display ON 34, and if inks run short, the printing apparatus 7 transmits amount of remaining ink warning information to the TV tuner 2. In response to this information, the TV panel 1 displays an amount of remaining ink warning 37. In the example shown in FIG. 9, a message that prompts the user to exchange magenta ink is displayed. This amount of remaining ink warning 37 is displayed for 5 seconds, and then automatically disappears.

If the user selects a TV display OFF button 35, as shown in FIG. 8, using the four arrow keys 18 of the remote controller 10 and then presses the enter button 19 (NO in step S12), it is set not to display various statuses of the printing apparatus 7 on the TV panel 1 (step S13). With this setting, the aforementioned amount of remaining ink warning is no longer displayed on the screen of the TV panel 1. Instead, the liquid crystal display 9 for status display of the printing apparatus 7 is enabled to display an amount of remaining ink warning.

Since the TV panel 1 is a screen that the user gazes upon, a display on the TV panel 1 is easily viewable since it is large in size. However, upon watching, in particular, a moving image such as a movie or the like, some users may find it disturbing if a status information display partially occupies the screen. In such a case, the user selects the TV display OFF 35 on the window shown in FIG. 8 to inhibit a status information display on the TV panel 1, thus eliminating the disturbing feeding that the user may experience. In this case, since the liquid crystal display 9 of the printing apparatus 7 displays information associated with printing, the user can be notified of the status of the printing apparatus 7.

In the description of the above example, the liquid crystal display 9 of the printing apparatus 7 displays the status information when the user selects the TV display OFF 35 on the window in FIG. 8. However, the liquid crystal display 11 of the remote controller 10 may display the status information. For example, when an amount of remaining ink warning has occurred, the liquid crystal display 9 of the printing apparatus 7 and/or the liquid crystal display 11 of the remote controller 10 can display the amount of remaining ink warning. Furthermore, it is also effective to blink the display so as to call the user's attention. In addition, upon pressing the enter button 19, the display on the liquid crystal display 11 of the remote controller 10 may disappear.

Selection of display/non-display of the status information on the TV panel 1 in this embodiment is not limited to the aforementioned selection method on the TV panel 1 using the remote controller 10. For example, a selection method using a dedicated selection key provided to the printing apparatus 7, that using both the liquid crystal display of the printing apparatus 7 and scroll buttons, and the like may be used, and the selection methods do not limit the present invention.

As described above, according to the first embodiment, the user can select display or non-display of the status information of the printing apparatus, and when he or she selects non-display, the status information is displayed not on the TV screen but on the display device of the printing apparatus. Hence, the system with high operability which can prevent the user from finding occupation of the status information on the screen disturbing, and can still clearly notify the status information can be implemented.

As described above, since the user can change display/non-display of the status information on the TV panel according to his or her favor, display/non-display of the status information can be controlled so as not to disturb viewing of the TV.

Second Embodiment

In the first embodiment, the user selects ON/OFF of display of the status information on the TV panel 1. By contrast, the second embodiment will explain a case in which a system incorporates means for transmitting display presence/absence information indicating whether or not the printing apparatus 7 comprises a display device such as a liquid crystal display or the like to the TV tuner 2, and processing is limited in accordance with the presence/absence of the display device.

Figure 10:
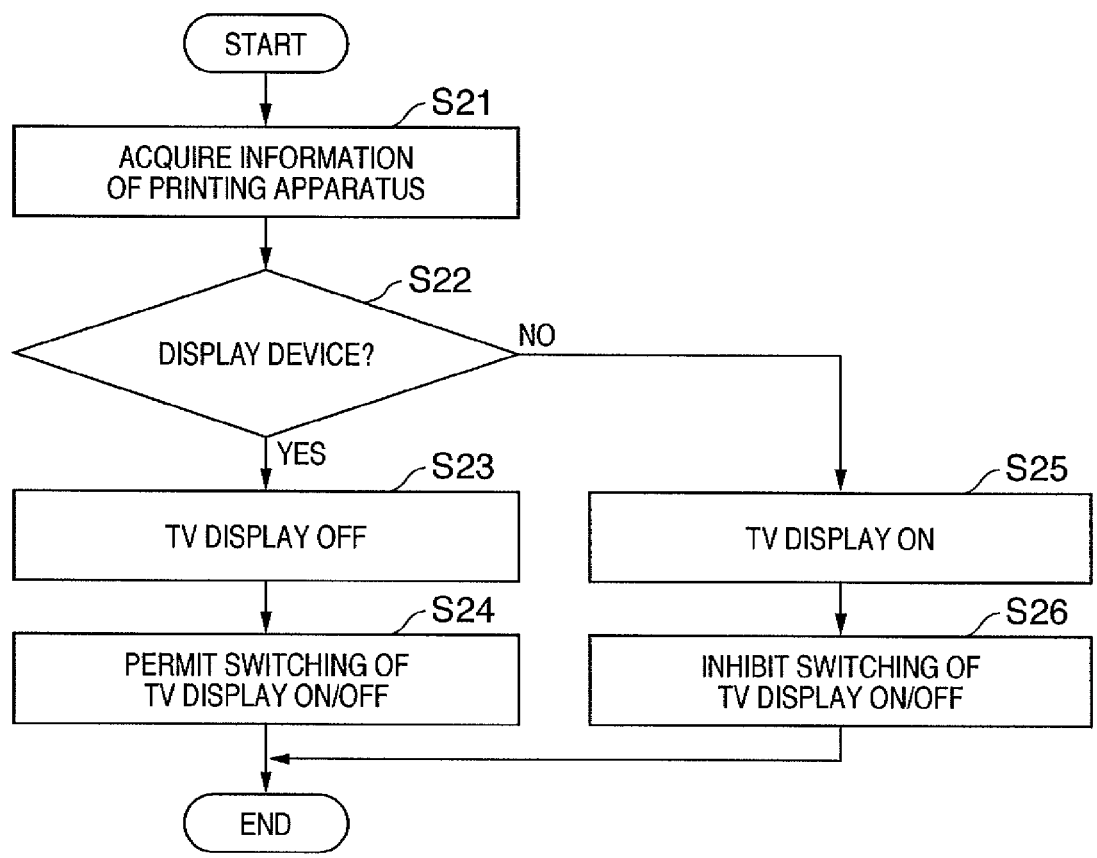
FIG. 10 is a flowchart showing status information display/non-display processing according to the second embodiment of the present invention.

FIG. 10 is a flowchart showing the TV display ON/OFF initial setting processing of status information according to the second embodiment.

When the power switch of the TV is turned on or when the printing apparatus is connected, information of the connected printing apparatus is acquired (step S21). This information includes information as to whether or not the printing apparatus has a display device.

If the printing apparatus has a display device (YES in step S22), "ITV display OFF" is set (step S23), and switching of "TV display ON/OFF" shown in FIG. 8 is permitted (step S24).

On the other hand, if the printing apparatus 7 does not have any display device (NO in step S22), "TV display ON" is set (step S25), and switching "TV display ON/OFF" shown in FIG. 8 is inhibited so as not to set "TV display OFF".

Note that it may be checked in step S22 if the printing apparatus 7 has a display device which has an area large enough to display status information. If the printing apparatus 7 has such display device, the process may advance to step S23. With this control, since the display device of the printing apparatus 7 has an area large enough to display status information, the user can be well notified of information by the display device of the printing apparatus 7 without using the TV panel 1, thus providing a system with high operability.

As a modification, if the printing apparatus 7 has a display device, status information may also be displayed on the TV more simply than that displayed if the printing apparatus 7 does not have any display device. That is, a message indicating that information to be notified may be displayed on the display device of the printing apparatus 7 or a certain predetermined icon may be displayed on the TV.

In either case, a status display environment suited to the system can be provided in accordance with whether or not the printing apparatus 7 has a display device.

Even when the initial setting in step S23 is "TV display OFF", if a function that can display information in an enlarged scale on the TV panel 1 in response to a specific operation such as long pressing of a predetermined key (e.g., the print key or the like) is added, a system which is excellent in terms of recognizability can be provided. Also, when the initial setting in step S25 is "TV display ON", if the user can temporarily turn off the display in response to a specific operation, a system with high operability, which can eliminate any disturbing feeling, can be provided.

Third Embodiment

Figure 11:
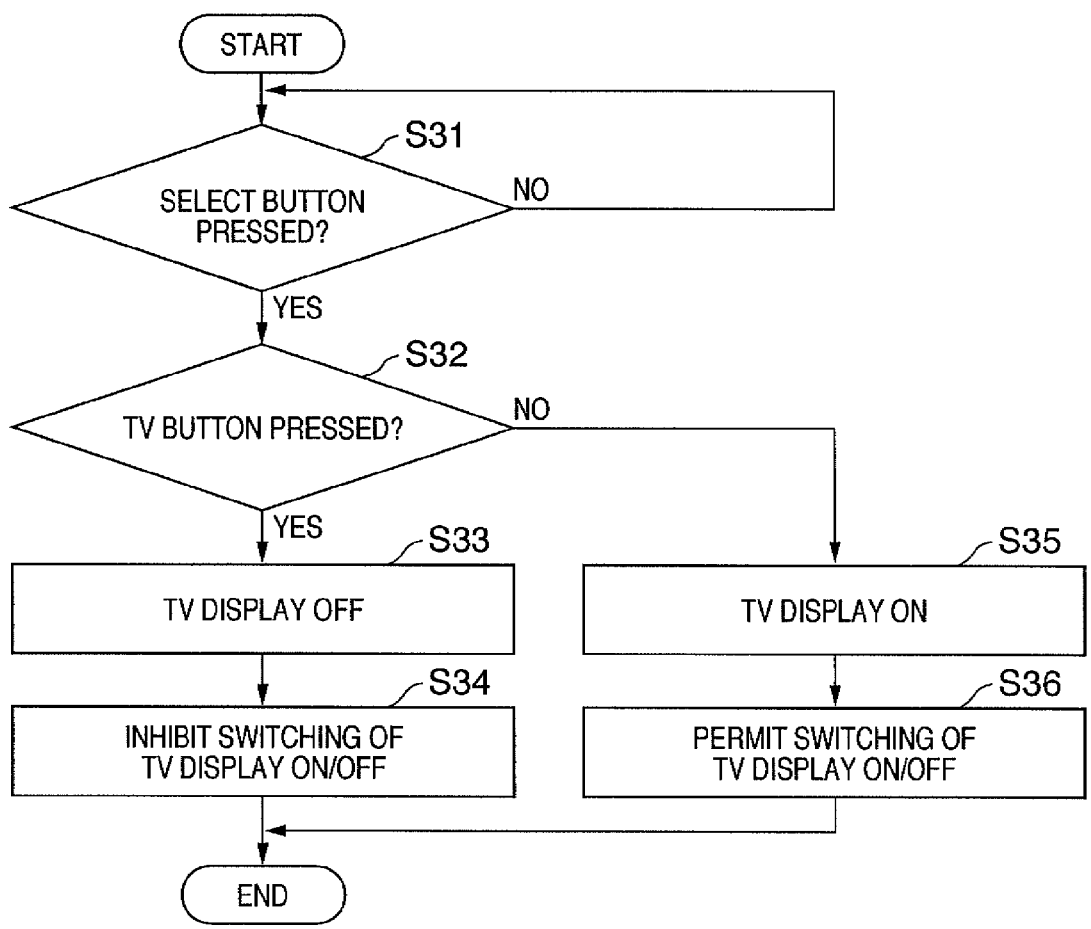
FIG. 11 is a flowchart showing status information display/non-display setting processing according to the third embodiment of the present invention.

As described in the first embodiment, the TV system shown in FIG. 1 can display various contents acquired from three information sources, that is, the broadcasting, memory card, and LAN (Internet), and these information sources are switched using the select buttons 13 shown in FIG. 2. As the contents acquired from these three information sources have different characteristics from each other, the third embodiment will explain a case in which the TV display ON/OFF control is made based on an information source with reference to FIG. 11.

It is checked in step S31 if the user presses one of the select buttons 13 used to select the information source and to switch the display window.

If the user presses one of the select buttons 13, the process advances to step S32 to check if the user presses the TV button. If the user presses the TV button, "TV display OFF" is set (step S33), and switching of "TV display ON/OFF" shown in FIG. 8 is inhibited (step S34). In this way, when the user selects broadcasting, status information is inhibited from being displayed on the TV.

This is for the following reason. That is, in case of the broadcasting, since moving images are main contents, if information different from a main title occupies the screen even for several seconds, the user feels intrusive and finds it disturbing strongly. Particularly, since an event such as a paper jam occurs unexpectedly and its message is displayed as such, the user finds it disturbing even more strongly. Video recording apparatuses using DVDs, hard disks, and the like have prevailed, and can record broadcasting contents. However, some broadcasting contents have a "copy never" attribute, and strongly have a temporary nature. Also, there are many contents which attach importance on realtimeness such as sports, news, and the like.

On the other hand, if the user does not press the TV button, that is, if he or she presses the INTERNET or PC CARD button, "TV display ON" is set (step S35), and switching of "TV display ON/OFF" shown in FIG. 8 is permitted (step S36).

This is because Internet contents mainly include text and still image information, which are not temporary data, and the user can freely return to the previous link. Streaming movies are also not temporary contents since the user can play them back many times if he or she presses a play button on the window. Therefore, even when the status information of the printing apparatus 7 is generated on the screen, the user finds it less disturbing. Instead, when the status information is displayed on the large screen, it is easily viewable, and the operability is high.

Likewise, memory card contents mainly include still image information obtained by a digital camera and the like and are not temporary. Hence, the user finds it less disturbing if status information is displayed for several seconds.

In this manner, in case of the TV system which can display contents from a plurality of information sources, ON/OFF of status information display on the TV is switched depending on the information sources, thus improving the operability.

In the third embodiment, when the information source is TV, "TV display OFF" is set; otherwise, "TV display ON" is set. However, the user may set in advance the relationship between the information sources and TV display ON/OFF. In this case, upon pressing the select buttons 13, the TV display ON/OFF control set by the user is executed.

In the description of the third embodiment, the number of types of information sources is three. However, the types and number of input sources are not limited to the aforementioned example.

Fourth Embodiment

The fourth embodiment will explain a case in which display of status information is turned on and off during broadcasting.

In the fourth embodiment, when the user presses the status display setting button 32 on the window shown in FIG. 7, the current window is switched to a window shown in FIG. 12.

Reference numeral 38 denotes a TV display full ON button. Upon pressing this button, status information is displayed on the TV panel 1 under any circumstances. Reference numeral 39 denotes a TV display full OFF button. Upon pressing this button, no status information is displayed on the TV. Reference numeral 40 denotes another setting button. Upon pressing this button, status information is displayed during display of contents other than a main title, and automatically disappears during display of the main title. For example, when a paper jam has occurred, a jam error is continuously displayed during time bands other than the main title until the user executes jam processing. When the user presses the other than main title ON button 40, as shown in FIG. 12, this setting is made. Note that a technique for distinguishing a main title from other contents is already implemented by detecting the presence/absence of multi-channel broadcasting, a silent period, or the like, so TV display of the status information can be turned on during display of contents other than the main title using such technique.

In the fourth embodiment, since status display does not appear during the main title, the user finds it less disturbing even during reception of broadcasting.

Other methods of selecting ON/OFF of status display during broadcasting, as described above, are available.

For example, a time period in which status information is displayed or not displayed on the TV panel 1 is designated, and the status information is displayed or not displayed on the TV panel 1 during the designated time period. For example, when TV display OFF of status information is set during a time period of a program that the user wants to watch, the user does not find appearance of status display disturbing even when he or she executes printing.

In case of a tuner which can receive an EPG (electronic program guide), the user may designate programs on the EPG and may also designate TV display ON/OFF of status information for respective designated programs. With this method as well, when TV display OFF of status information is set during a time period of a program that the user wants to watch, the user does not find appearance of status display disturbing.

Note that the second or third embodiment and the fourth embodiment can be simultaneously executed on an identical system.

Fifth Embodiment

The fifth embodiment will explain a system in which display ON/OFF can be set for each type of status information.

In the fifth embodiment, when the user presses the status display setting button 32 on the window shown in FIG. 7, a window shown in FIG. 13 appears. The window in FIG. 13 includes buttons for a print end notification display item 42, ink presence/absence warning display item 43, paper jam display item 44, and miscellaneous error display item 45, the ON/OFF state of which can be set. When the user selects either ON or OFF for each item using the four arrow keys 18 of the remote controller 10 and presses the enter button 19, the selected state is set. FIG. 13 exemplifies a case in which only the print end notification display item 42 is set to be ON. Note that the remaining three items which are set to be OFF may be displayed on the liquid crystal display 9 for status display of the printing apparatus 7.

In the fifth embodiment, since TV display ON/OFF of status information can be switched for each type of status information, convenience can be improved according to user's usability.

Note that the fifth embodiment can be implemented in combination with any of the first to fourth embodiments.

Other Embodiments

The objects of the present invention can also be achieved as follows. That is, a storage medium (or recording medium), which records a program code of software that can implement the functions of the above-mentioned embodiments is supplied to the TV tuner 2. A computer (or a CPU or MPU) of the TV tuner 2 reads out and executes the program code stored in the storage medium. In this case, the program code itself read out from the storage medium implements the functions of the above-mentioned embodiments, and the storage medium which records the program code constitutes the present invention.

The functions of the aforementioned embodiment can be implemented not only when the computer executes the readout program but also by the following processing. That is, this is the case wherein an operating system (OS) or the like running on the computer performs some or all of actual processes based on an instruction of the readout program code, and the functions of the aforementioned embodiments are implemented by these processes. As the storage medium that stores the program code, for example, a flexible disk, hard disk, ROM, RAM, magnetic tape, nonvolatile memory card, CD-ROM, CD-R, DVD, optical disk, magneto-optical disk, MO, and the like may be used. Also, a computer network such as a LAN (local area network), WAN (wide area network), or the like can be used to supply the program code.

The present invention is not limited to the above embodiments and various changes and modifications can be made within the spirit and scope of the present invention. Therefore to apprise the public of the scope of the present invention, the following claims are appended.

This application claims the benefit of Japanese Patent Application No. 2005-256863, filed Sep. 5, 2005, which is hereby incorporated by reference herein in its entirety.

The invention claimed is:

1. A display apparatus, comprising:
a receiving unit that receives error information from a printing apparatus, wherein the error information relating to a printing material or a printing medium;
a first display unit; and
a control unit that selects a first display mode or a second display mode based on whether the printing apparatus has a second display unit,
wherein the control unit selects the first display mode if the printing apparatus has the second display unit, and selects the second display mode if the printing apparatus does not have the second display unit,
wherein the first display unit avoids displaying the error information if the error information is received from the printing apparatus while the first display mode is selected, and
wherein the first display unit displays the error information in a different manner than the second display unit if the error information is received from the printing apparatus while the second display mode is selected.

2. A method for a display apparatus comprising a first display unit, the method comprising:
receiving error information from a printing apparatus, wherein the error information relating to a printing material or a printing medium;
selecting a first display mode or a second display mode based on whether the printing apparatus has a second display unit, wherein the first display mode is selected if the printing apparatus has the second display unit, and the second display mode is selected if the printing apparatus does not have the second display unit;
avoiding displaying the error information on the first display unit if the error information is received from the printing apparatus while the first display mode is selected; and
displaying the error information on the first display unit in a different manner than the second display unit if the error information is received from the printing apparatus while the second display mode is selected.

3. A non-transitory computer-readable storage medium that stores a program for causing a computer to execute a method for a display apparatus comprising a first display unit, the method comprising:
receiving error information from a printing apparatus, wherein the error information relating to a printing material or a printing medium;
selecting a first display mode or a second display mode based on whether the printing apparatus has a second display unit, wherein the first display mode is selected if the printing apparatus has the second display unit, and the second display mode is selected if the printing apparatus does not have the second display unit;
avoiding displaying the error information on the first display unit if the error information is received from the printing apparatus while the first display mode is selected; and
displaying the error information on the first display unit in a different manner than the second display unit if the error information is received from the printing apparatus while the second display mode is selected.

4. The display apparatus according to claim 1, wherein the error information relates to a remaining amount of the printing material.

5. The display apparatus according to claim 1, wherein the error information relates to a remaining amount of an ink.

6. The display apparatus according to claim 1, wherein the error information relates to a remaining amount of a printing medium.

7. The display apparatus according to claim 1, wherein the error information relates to a remaining amount of paper sheets.

8. The display apparatus according to claim 1, wherein the error information relates to a paper jam.

9. The display apparatus according to claim 1, wherein the control unit determines whether or not the printing apparatus has the second display unit based on device information received from the printing apparatus.

10. The display apparatus according to claim 1, wherein the control unit allows a user to change the first display mode to the second display mode if the printing apparatus has the second display unit.

11. The display apparatus according to claim 1, wherein the control unit prevents a user from changing the second display mode to the first display mode if the printing apparatus does not have the second display unit.

12. The method according to claim 2, wherein the error information relates to a remaining amount of the printing material.

13. The method according to claim 2, wherein the error information relates to a remaining amount of an ink.

14. The method according to claim 2, wherein the error information relates to a remaining amount of a printing medium.

15. The method according to claim 2, wherein the error information relates to a remaining amount of paper sheets.

16. The method according to claim 2, wherein the error information relates to a paper jam.

17. The method according to claim 2, further comprising determining whether or not the printing apparatus has the second display unit based on device information received from the printing apparatus.

18. The method according to claim 2, further comprising allowing a user to change the first display mode to the second display mode if the printing apparatus has the second display unit.

19. The method according to claim 2, further comprising preventing a user from changing the second display mode to the first display mode if the printing apparatus does not have the second display unit.

* * * * *